United States Patent [19]

Glehr

[11] Patent Number: 5,019,988
[45] Date of Patent: May 28, 1991

[54] METHOD FOR GENERATING TRIGGER PULSES

[75] Inventor: Manfred Glehr, Eggenfelden, Fed. Rep. of Germany

[73] Assignee: Siemens Aktiengesellschaft, Berlin and Munich, Fed. Rep. of Germany

[21] Appl. No.: 352,365

[22] Filed: May 16, 1989

[30] Foreign Application Priority Data

May 16, 1988 [DE] Fed. Rep. of Germany ........ 3816643

[51] Int. Cl.$^5$ ............................................. F02P 5/15
[52] U.S. Cl. ............................... 364/431.03; 123/414
[58] Field of Search ................ 364/431.03, 431.04; 123/414, 415, 416, 417

[56] References Cited

U.S. PATENT DOCUMENTS

| | | | |
|---|---|---|---|
| 4,009,378 | 2/1977 | Sakamoto | 364/431.04 |
| 4,158,305 | 6/1979 | Shipley | |
| 4,355,613 | 10/1982 | Rode et al. | 123/414 |
| 4,360,874 | 11/1982 | Ohba et al. | 364/431.04 |
| 4,520,781 | 6/1985 | Nishida | 123/414 |
| 4,825,373 | 4/1989 | Nakamura et al. | 364/431.03 |

FOREIGN PATENT DOCUMENTS

| | | |
|---|---|---|
| 0085909 | 8/1983 | European Pat. Off. |
| 0150642 | 8/1985 | European Pat. Off. |
| 0240858 | 10/1987 | European Pat. Off. |
| 0242994 | 10/1987 | European Pat. Off. |
| 56-75963 | 6/1981 | Japan |
| 60-1376 | 1/1985 | Japan |
| 60-17269 | 1/1985 | Japan |

*Primary Examiner*—Parshotam S. Lall
*Assistant Examiner*—Gary Yacura
*Attorney, Agent, or Firm*—Hill, Van Santen, Steadman & Simpson

[57] ABSTRACT

In a method for generating trigger or ignition pulses that control a periodic event of an internal combustion engine, a precalculation is required of a calculated running time $T_{n+1}$ that a crank shaft of the internal combustion engine meets in order to traverse the respectively next of prescribed, constant allowed ranges $WB_n$. For this precalculation, a real running time $TE_n$ is measured after every traversal of one of the allowed ranges $WB_n$ and the next, following running time is precalculated with an approximation. The precalculated value of this calculated running time $T_{n+1}$ is derived from the equation:

$$T_{n+1} = TE_n - K_n \text{ where } K_n = \tfrac{1}{2} \times (T_n - TE_n).$$

1 Claim, 3 Drawing Sheets

FIG 4

| WB [DEGREES] | $TE_n$ [msec] | $T_n$ [msec] | ABSOLUTE ERROR [microsec] |
|---|---|---|---|
| 0 | 0.000 | 0.000 | 0.0 |
| 6 | 44.721 | 0.000 | -44721.4 |
| 12 | 18.524 | 67.082 | 48557.8 |
| 18 | 14.214 | -5.755 | -19968.8 |
| 24 | 11.983 | 24.199 | 12215.5 |
| 30 | 10.557 | 5.875 | -4682.0 |
| 36 | 9.545 | 12.898 | 3353.8 |
| 42 | 8.777 | 7.868 | -909.4 |
| 48 | 8.170 | 9.232 | 1062.3 |
| 54 | 7.673 | 7.638 | -34.6 |
| 60 | 7.257 | 7.690 | 433.0 |
| 66 | 6.903 | 7.041 | 138.2 |
| 72 | 6.595 | 6.834 | 238.2 |
| 78 | 6.326 | 6.476 | 150.5 |
| 84 | 6.087 | 6.251 | 163.7 |
| 90 | 5.873 | 6.005 | 131.9 |
| 96 | 5.680 | 5.807 | 126.8 |
| 102 | 5.505 | 5.617 | 111.5 |
| 108 | 5.346 | 5.450 | 103.9 |
| ⋮ | ⋮ | ⋮ | ⋮ |
| 138 | 4.714 | 4.785 | 70.6 |
| ⋮ | ⋮ | ⋮ | ⋮ |
| 168 | 4.264 | 4.316 | 52.2 |
| ⋮ | ⋮ | ⋮ | ⋮ |
| 198 | 3.922 | 3.963 | 40.5 |
| ⋮ | ⋮ | ⋮ | ⋮ |
| 228 | 3.652 | 3.684 | 32.7 |
| ⋮ | ⋮ | ⋮ | ⋮ |
| 258 | 3.430 | 3.457 | 27.1 |
| ⋮ | ⋮ | ⋮ | ⋮ |
| 288 | 3.244 | 3.267 | 22.9 |
| ⋮ | ⋮ | ⋮ | ⋮ |
| 318 | 3.086 | 3.106 | 19.7 |
| ⋮ | ⋮ | ⋮ | ⋮ |
| 348 | 2.949 | 2.966 | 17.2 |
| ⋮ | ⋮ | ⋮ | ⋮ |
| 378 | 2.828 | 2.844 | 15.1 |
| ⋮ | ⋮ | ⋮ | ⋮ |
| 408 | 2.722 | 2.735 | 13.5 |
| 414 | 2.702 | 2.715 | 13.2 |
| 420 | 2.682 | 2.695 | 12.7 |

METHOD FOR GENERATING TRIGGER PULSES

BACKGROUND OF THE INVENTION

The present invention is directed to a method for generating trigger or ignition pulses for an internal combustion engine.

In addition to a prescribed control or trigger delay angle at which a periodic event should be executed, motor control systems also require information about the respective relative or angular position of the crank shaft or of the cam shaft with respect to a reference mark such as, for example, the upper dead point. This is in order to generate trigger or ignition pulses that control a periodically repeating event of an internal combustion engine, such as, for example, regarding ignition the beginning of the closing or dwell angle fuel injection. For example, a toothed disk that senses a generator is attached to the crank shaft for this purpose. This generator supplies angular signals that correspond to the respective angular or relative position of the crank shaft.

The tooth pitch of this toothed disk defines the smallest possible resolution, i.e. a smallest possible range between two angular positions that can be distinguished by the generator. Trigger delay angles lying therebetween can only be identified on the basis of a preliminary calculation.

When the crank shaft has traversed one of the allowed ranges, a calculated running time that it requires for traversing the next, successive allowed range is required for such a preliminary calculation. It is thereby assumed that the internal combustion engine continues to move with a constant speed. The calculated running time then is determined from a linear extrapolation. The point in time at which the trigger delay angle is reached is finally calculated by a linear interpolation into this allowed range.

When, however, the internal combustion engine is accelerated or retarded so that the speed changes, then an error that increases with the degree of the acceleration o retardation will arise in this preliminary calculation. The error is greater, for greater allowed ranges, so that optimally highly resolving toothed disks must be used.

SUMMARY OF THE INVENTION

In a method for generating trigger or ignition pulses, the object of the present invention is in executing the preliminary calculation of the point in time at which the trigger delay angle is reached that is thereby required such that it supplies values with good precision in all operating conditions of the internal combustion engine (constant speed, acceleration, retardation) even for a relatively large allowed range. Nonetheless, the complexity should be low and the value for the precalculated point in time should be quickly available for further processing.

Specifically, the present invention is a method for generating trigger pulses at allocated trigger points in time tA for the control of periodically repeating events of an internal combustion engine, whereby an angular position of a crank shaft in the internal combustion engine at which a trigger pulse (A) is to be generated relative to a reference mark (SO) is calculated with a trigger delay angle (Z) on the basis of linear extrapolation. The method has the steps of, proceeding from the reference mark (SO) after every rotation of the crank shaft by an allowed angle (ZV) through an allowed range WB thereby defined, measuring a real running time $TE_n$ required therefore, precalculating the calculated running time $T_{n+1}$ for a further rotation of the crank shaft through a next allowed range $WB_{n+1}$ according to the equation:

$$T_{n+1} = TE_n - K_n$$

where $$K_n = \tfrac{1}{2}(T_n - TE_n)$$ and where, $T_n$ is a calculated running time that was calculated preceeding the precalculating of $T_{n+1}$; calculating a target range in which the trigger delay angle (Z) lies and calculating the size of a remaining angle (ZR) between the beginning of the target range and the trigger delay angle (Z); and calculating the trigger point in time, tA, of every trigger pulse (A) calculated from the beginning of the target range according to the equation:

$$tA = \frac{ZR}{ZV} \times T_{n+1}.$$

The present invention provides that the calculated running time be calculated from a simple approximation. The approximation is based on a measured real running time that the crank shaft has needed for the allowed range just traversed. The sought running time for the next allowed range then results from this real running time minus a correction value. This correction value is equal to half of the absolute error (previous calculated running time minus measured real running time) in the pre-calculation of the calculated running time for the preceding allowed range. A target range is that allowed range in which the trigger delay angle lies. The point in time at which the crank shaft reaches the trigger delay angle within this target range and at which the trigger or ignition pulse must occur then derives in a simple manner from this calculated running time by a linear interpolation within the target range.

Only a simple addition, a subtraction and a division by two ar required for calculating the calculated running time. Accordingly, for example, a hardware implementation can be composed of a few components that can supply the calculated running time very quickly as a consequence of the simple arithmetic operations.

Since the correction value is acquired from the respective error in the calculation of the preceding calculated running time, an automatic correction arises that makes the method equally useable in all operating conditions of the internal combustion engine. The precision required within the framework of a motor control for the precalculation of the respective running time is thus always established regardless of whether the internal combustion engine is running at constant speed or whether it is being accelerated or retarded. As tests have shown, this is valid even for non-uniform accelerations or retardations since the acceleration or retardation can be considered constant with good approximation within small angular ranges.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 4 is a measured table having values for real running times and the respectively associated calculated running times.

DESCRIPTION OF THE PREFERRED EMBODIMENT

Figure 1:
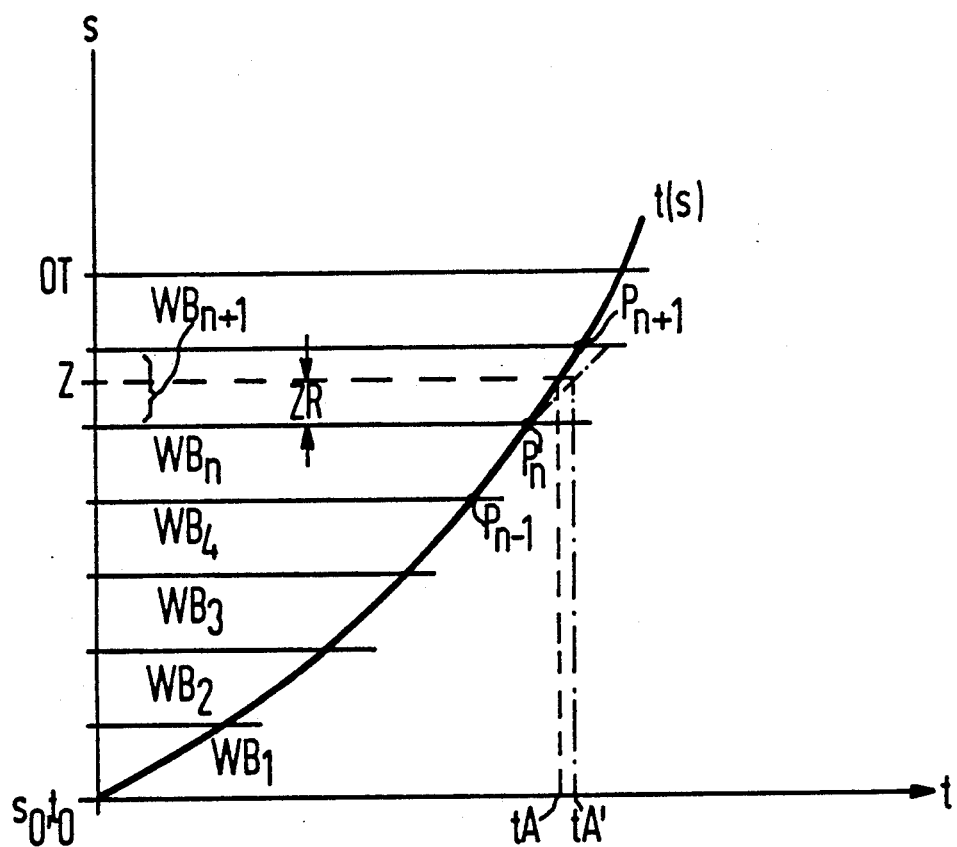
FIG. 1 is a path-time diagram of an acceleration event for explaining the method of the present invention.

FIG. 1 shows a path-time diagram with the graph (ts) of a uniformly accelerated motion of the crank shaft of an internal combustion engine. Allowed ranges $WB_1$ through $WB_n$ that extend over allowed angles ZV of identical size are entered on the ordinate. A prescribed trigger delay angle Z lies in the allowed range $WB_{n+1}$, a point in time tA for a trigger or ignition pulse being given when this is reached. The graph t(s) shows three points $P_{n-1}$, $P_n$, $P_{n+1}$ that are allocated to the allowed ranges $WB_n$ and $WB_{n+1}$.

Figure 2:
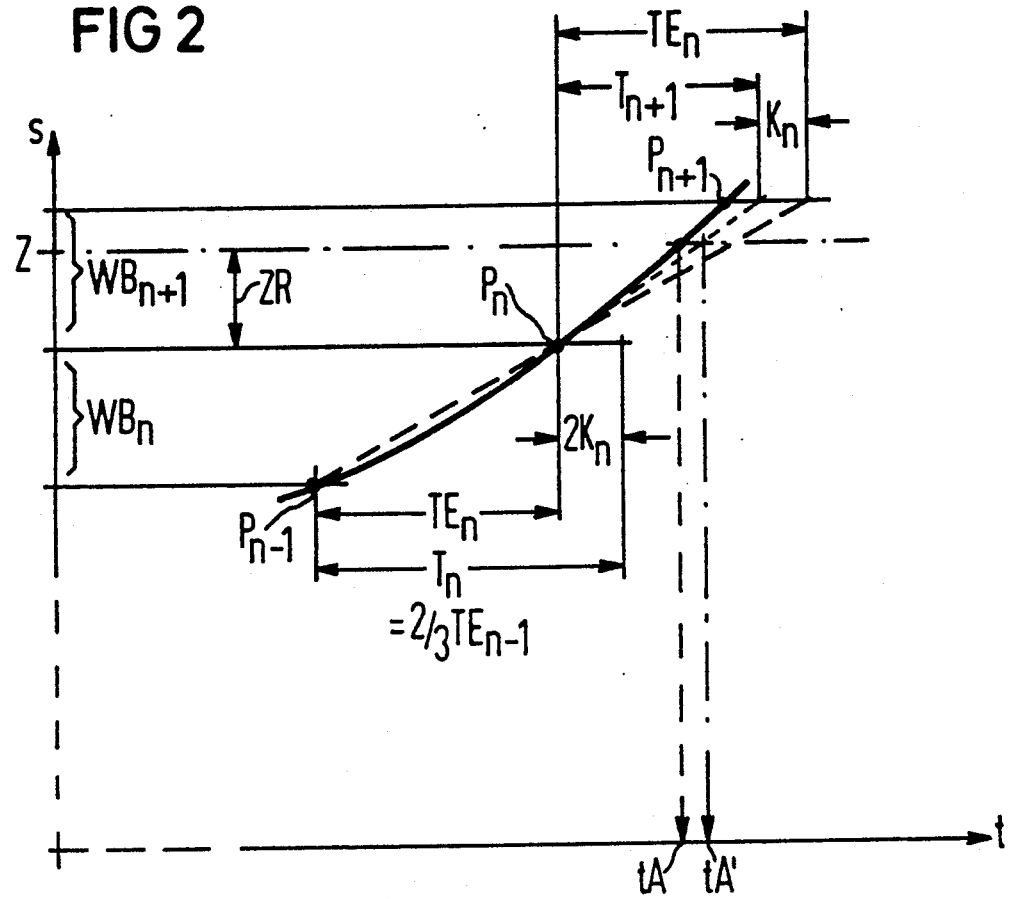
FIG. 2 is an enlarged portion of FIG. 1.

The method for the precalculation of the calculated running time $T_{n+1}$ shall be explained in the example. This calculated running time $T_{n+1}$ is the time that the crank shaft will presumably need in order to traverse the allowed range $WB_{n+1}$. It is calculated when the crank shaft has reached the point $P_n$. For illustration, this part of the graph t(s) is shown enlarged in FIG. 2. A real running time $TE_n$ that the crank shaft needed to traverse the preceding allowed range $WB_n$ is measured. The calculated running time $T_{n+1}$ then derives from:

$T_{n+1} = TE_n - K_n$ and $K_n = \frac{1}{2} \times (T_n - TE_n)$.

$T_n$ is the calculated running time that was calculated preceding, having been calculated at the point in time $P_{n-1}$. Finally by linear interpolation within the allowed range $WB_{n+1}$, a trigger point in time tA' that deviates only slightly from the ideal trigger point in time tA results.

Figure 3:
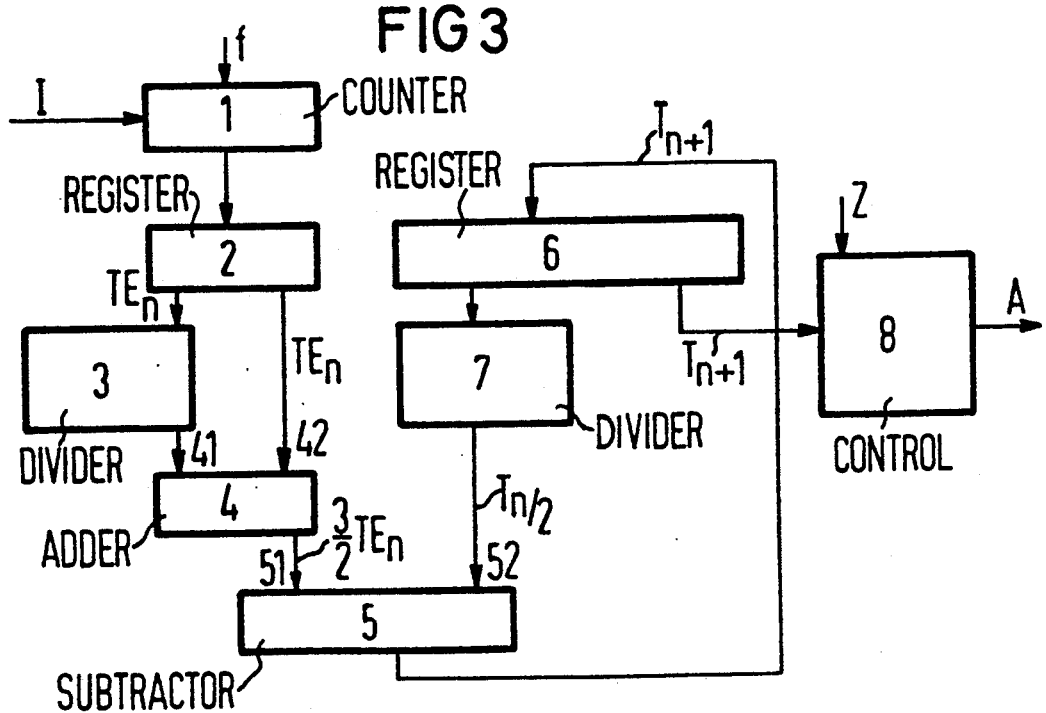
FIG. 3 is a general block diagram for the implementation of the method.

A embodiment for the implementation of the method shall be set forth with reference to FIG. 3. A measuring means 1 receives counting pulses f having a constant repetition rate and control pulses I that a generator senses from a toothed disk having equidistant teeth that is attached to the crank shaft of an internal combustion engine. The measuring means 1 is a counter that is started, or stopped by the control pulses I at the beginning and end of every allowed range. After the stopping of the counter, its counter reading is proportional to the real running time $TA_n$ that the crank shaft needed for traversing the allowed range $WB_n$ of, for example, 6°. The measuring means 1 then forwards this counter-reading to a register 2 and resets the counter.

The real running time $TA_n$ is now present in the register 2 as a binary number. It is then directly forwarded to on of the adder inputs 42 of an adder element 4. Via a division stage 3, a further adder input 41 of the adder element 4 receives the value of the real running time $TA_n$ divided by two. A value of $3/2 \times TA_n$ then appears at the output of the adder element 4.

The division stage 3 is composed of a connection via which the outputs of the register 2 are connected to the input 41 displaced by one position toward the right: in the binary system, this is equivalent to a division by two.

The value of $3/2 \times TA_n$ finally arrives at an input 51 of a subtraction element 5 that forms the difference between the value at the input 51 and a value at a second input 52. This value at the input 52 is equal to 0 at the first pass since it is initially formed from the output value of the subtraction element 5. As shall be set forth later, half the value of the precalculated calculated running time $T_n$ always is present at this input 52 beginning with the second pass.

The subtraction element 5 thus forms the precalculation for the next, following running time $T_{n+1}$ according to the equation:

$T_{n+1} = 3/2 \times TE_n - \frac{1}{2} \times T_n$

From the output of the subtraction element 5, the precalculated value for the next, following running time $T_{n+1}$ proceeds into an approximation register 6. It is available there at a tap for further processing in a control system 8. Via a second output of the approximation register 6, the value of the running time $T_{n+1}$ proceeds to a division stage 7 that executes a division by 2. This division stage 7 is constructed in a fashion analogous to that of the division stage 3. The value of $\frac{1}{2} \times T_n$ is then present at the output of the division stage 7, this value, as mentioned above, then proceeding to the input 52 of the subtraction element 5.

The control system 8 calculates a point in time tA' for a trigger or ignition pulse A that effects the ignition of or an injection event of an internal combustion engine. In the example, the control system 8 receives a trigger delay angle Z that is firing angle here for a further means (not shown) that calculates the respectively optimum firing angle Z for the internal combustion engine. The control system 8 then calculates that allowed range $WB_{n+1}$ having the size ZV in which this firing angle Z lies. To this end, it forms a division Z/ZV. A whole number part of the result of this division identifies the number of the allowed range $WB_{n+1}$ at which (remainder equals 0) or following which (remainder unequal to 0) the firing angle Z lies. A potential remainder ZR of this division defines the firing angle Z within this allowed range $WB_{n+1}$. The point in time tA' at which the control system 8 must output the trigger pulse A for the ignition, since the crank shaft has then reached the firing angle Z, is defined by a linear interpolation within the allowed range $WB_{n+1}$ with the quantity ZV proceeding from the precalculated running time $T_{n+1}$, being defined at:

$tA = ZR/ZV \times T_{n+1}$

The precalculation of the running time $T_{n+1}$ according to the proposed method, of course, can also be replaced by some other arrangement that works in an equivalent fashion. When the motor control system has adequate calculating capacity available, a software program routine can also be used instead of a hardware implementation.

FIG. 4, finally, shows a numerical example of calculated running times $T_{n+1}$ precalculated with the proposed method for linearly accelerated motion. The values for the successive, equidistant allowed ranges $WB_n$ having an allowed angle ZV of 6° are entered in the first column. The respectively appertaining values for the real running time $TE_n$ are in column 2. Column 3 contains the respectively associated value of the calculated running time $T_n$ precalculated according to the method. Column 4, finally, contains the absolute error of the value of the respective, precalculated calculated running time $T_n$ with respect to the value of the real running time, $TE_n$.

It may be seen from FIG. 4 that the absolute error is relatively large at the beginning of the method and then becomes smaller and smaller. Even after the crank shaft has traversed only an angle of 102°, this absolute error now only amounts to 111.5 μs, this corresponding to a relative error of only 2% with reference to the real running time $TE_n$ of 5.505 ms. This shows that adequately precise values that become more and more precise are supplied with this method after about a crank shaft rotation of 100° following the start of the method.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method for generating trigger pulses at allocated trigger points in time tA for the control of periodically repeating events of an internal combustion engine, whereby an angular position of a crank shaft in the internal combustion engine at which a trigger pulse is to be generated relative to a reference mark is calculated with a control angle on the basis of linear extrapolation, comprising the steps of: proceeding from the reference mark after every rotation of the crank shaft by a given angle, ZV, through a given range thereby defined, measuring a real running time $TE_n$ for a rotation of the crank shaft through a range, $WE_n$, required therefore; calculating the running time $T_{n+1}$ for a further rotation of the crank shaft through a next given range $WB_{n+1}$ according to the equation:

$$T_{n+1} = TE_n - K_n$$

where $$K_n = \tfrac{1}{2}(T_n - TE_n) \text{ and}$$

where, $T_n$ is a calculated running time that was calculated preceding the calculating of $T_{n+1}$; calculating a target range in which the control angle lies and calculating the size of a remaining angle, ZR, between the beginning of the target range and the control angle; and calculating the trigger point in time, tA, of every trigger pulse calculated from the beginning of the target range according to the equation:

$$tA = \frac{ZR}{ZV} \times T_{n+1}; \text{ and}$$

using the trigger point in time, tA, to control the internal combustion engine.

* * * * *